April 24, 1934.   R. N. BROWN   1,956,001
METHOD OF MAKING PISTONS
Original Filed June 2, 1927
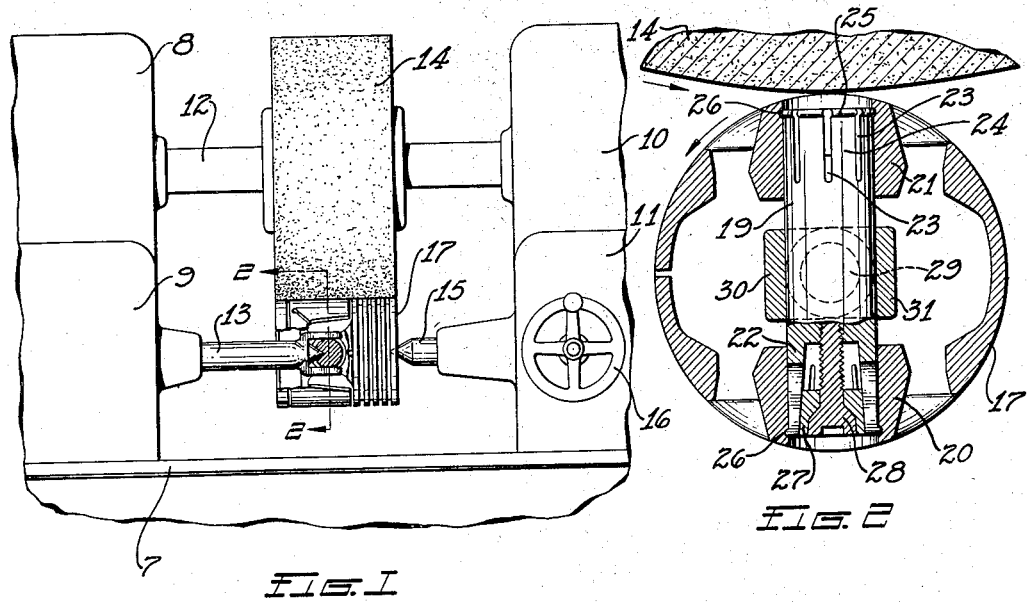
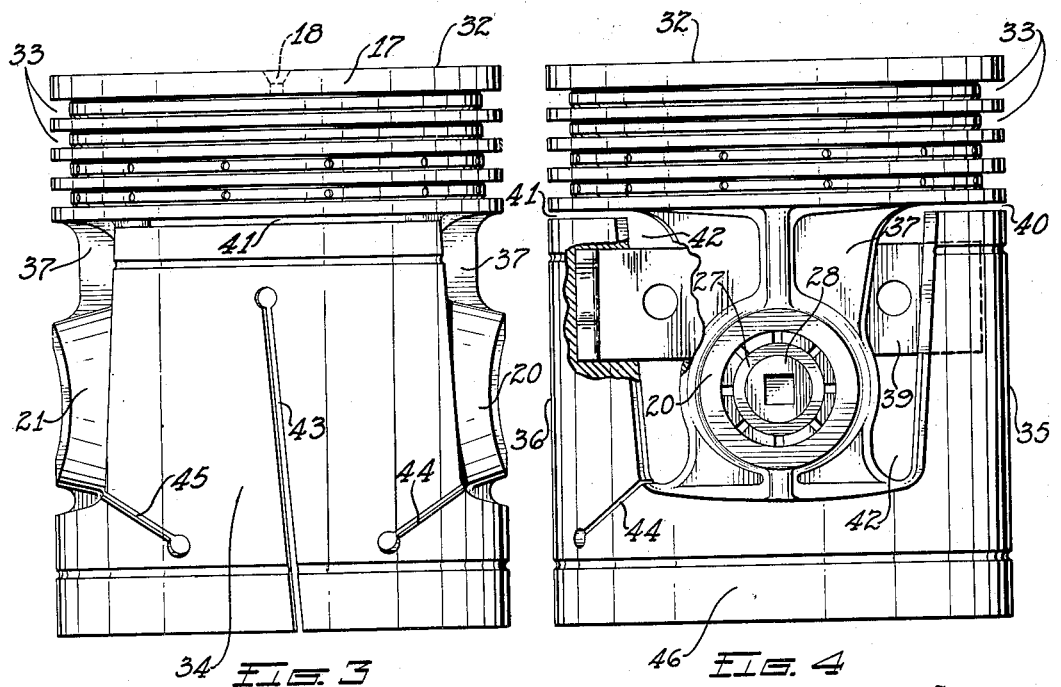
Inventor
ROBERT N. BROWN.
By Miller Sittles
Attorney Patented Apr. 24, 1934

1,956,001

UNITED STATES PATENT OFFICE 1,956,001

METHOD OF MAKING PISTONS

Robert N. Brown, Detroit, Mich., assignor to Packard Motor Car Company, Detroit, Mich., a corporation of Michigan Application June 2, 1927, Serial No. 195,937
Renewed April 13, 1932

11 Claims. (Cl. 29—156.5)

This invention relates to internal combustion engines and more particularly to means for and methods of grinding pistons.

The principal object of this invention is to provide a novel method of finishing pistons to impart to the skirt during the finishing operation, an oval or elliptical shape.

The above and other objects of my invention will become apparent from the following description taken in connection with the accompanying drawing, wherein:

Fig. 1 shows a piston holding and grinding device and a piston positioned thereon for grinding in accordance with the method of this invention;

Fig. 2 is an enlarged sectional view on line 2—2 of Fig. 1, the piston being shown rotated 90 degrees;

Fig. 3 is an enlarged elevation of the piston shown in Figs. 1 and 2, and

Fig. 4 is a similar view with the piston rotated 90° from the position shown in Fig. 3.

The device shown in Fig. 1 includes a base 7 supporting driving mechanisms 8 and 9 and standards 10 and 11. The mechanisms 8 and 9 include respectively a rotatable shaft 12 and a rotatable centering shaft 13, the shaft 12 having attached thereto a grinding element 14, the remote end of the shaft being supported in a bearing in the standard 10. The standard 11 carries a second centering shaft 15 positioned in axial alinement with the shaft 13, and a suitable adjusting mechanism including a control handle 16 adapted to move the shaft 15 axially. The centers 13 and 15 are adapted to support in exact axial alinement and to rotate piston 17 in engagement with the grinder 14. The members 13 and 15 are provided with points adapted to be maintained in precise alinement parallel with the axis of rotation of the grinder 14. The head of the piston 17 is provided with a lathe center 18, Fig. 3, positioned accurately concentric with the piston axis, adapted to receive the point of the pin 15. An expanding piston pin 19, Fig. 2, is inserted in the piston pin holes provided in the bosses, 20 and 21. The piston pin 19 has recessed end portions 22 including radial slots 23 defining flexible arcuate fingers 24 having laterally extending arcuate flanges 25 arranged in a circle and adapted to engage circumferential grooves 26 in the piston pin holes. Frusto-conical members 27 are positioned in the respective recesses of the piston pin and are provided with axially positioned bolts 28 threaded into the solid portion of the pin with their heads counter-sunk in suitable recesses in the members 27. The pin 19 has a radial conical-shaped hole 29 at its mid-point adapted to receive the mandrel 13. When the pin 19 is inserted in the bosses it is positioned so that the center of the hole 29 is exactly on the axis of the piston and faces the bottom of the skirt. In this position the flanges 25 engage the circumferential grooves 26. The bolts 28 are then adjusted so that the conical members 27 press the expansible fingers 24 into intimate engagement with the wall of the piston pin holes for rigidly retaining the pin in position. The mandrel 13 includes an integral bi-furcated portion having legs 30 and 31 adapted to straddle the pin 19 for applying a torque adapted to rotate the piston.

The piston 17 is shown more in detail in Figs. 3 and 4. This piston includes a head portion 32 having a ring belt provided with piston ring grooves 33, and dependent flanges or webs 37 including the piston pin bosses 20 and 21 and a skirt portion 34 including bearing faces 35 and 36 formed integral with the flanges 37 and supported thereby. The flanges 37 have cast therein transverse reinforcing struts 39 adapted to prevent undue expansion and contraction the ends of the struts being imbedded in the wall of the skirt to provide suitable supports for the skirt. The piston 17 is preferably made of aluminum or one of its alloys, but it may be made of any other suitable material.

The head and skirt are separated in part by circumferential slots 40 and 41 cut through the bearing faces below the lower ring belt and extending into apertures 42 adjacent to the webs 37. The edges of the bearing faces adjacent to the pin bosses are tapered in an axial direction to provide a gradually increasing surface area, the purpose of which will appear farther on.

The face 35 of the piston may be termed its bearing face because it is adapted to be so associated with the cylinder, the crankshaft and connecting rod of the engine that it will support the greater pressure during operation. The face 36 which is subjected to considerably less pressure than the face 35, is provided with a slot 43 positioned at a slight angle with respect to the axis of the piston and extending from the bottom of the skirt nearly to the top thereof. Additional slots 44 and 45 extend from the bottom of the apertures 42 adjacent to the piston pin bosses, at an angle of approximately 45 degrees with respect to the piston axis a distance about half way to the bottom of the skirt. The slots 43, 44 and 45 allow expansion of the skirt and prevent excessive pressure against the cylinder wall by enabling the skirt to yield circumferentially. The diagonal positions of these grooves also prevent scoring of the cylinder.

The ends of the piston pin bosses 20 and 21 are relieved somewhat so as not to engage the surface of the cylinder and the portions 46 of the skirt below the bosses are preferably also relieved or reduced in diameter by the method herein described, so that the cross section of the skirt at this point is substantially elliptical.

In grinding the piston, the grinding element 14, which may be an emery wheel is rotated in one direction by the driving mechanism 12, as indicated by the arrow in Fig. 2, whereas the piston 17 is rotated by the driving mechanism 13 so that its surface engaged by the grinder moves in the opposite direction, as indicated by the arrow.

The pin 19 being rigidly centered on the shaft 13 and its ends being rigidly locked in the hangers or webs 37 which are integrally connected at their adjacent ends to the narrow skirt portions 46 below the bosses, these skirt portions, which are on a diameter parallel to the axis of the pin bosses, are more firmly supported than the free bearing portions 35 and 36 at right angles thereto. The bearing portions 35 and 36 being less firmly supported than the narrow portions 46 yield inwardly so that more material is removed by the grinding wheel from the narrow portions 46 than from the bearing portions which are less solidly supported. Thus the skirt is ground oval or elliptical so that the lower portions 46 below the piston pin bosses are relieved and do not engage the piston cylinder upon expansion hence scoring of the cylinders and sticking of the piston is prevented.

I have also found that with the grinding wheel such as shown in my drawing the pressure per unit on the bearing faces 35 and 36 is less than on the portions 46 and as a result of this difference in pressure per unit area the grinder is caused to remove more material from the narrow portions 46 than from the bearing surfaces, this action also contributing toward the oval or elliptical shape of the piston.

Although this invention has been described in connection with certain specific embodiments, it is to be understood that the principles involved are susceptible of other modifications that will readily occur to persons skilled in the art, hence the invention is to be limited only as indicated by the scope of the appended claims.

What is claimed is:

1. The method of producing a piston comprising forming the skirt of the piston with bearing faces having their edges tapering in an axial direction, slotting at least one of the bearing faces and rotating the piston in engagement with a grinding element.

2. The method of producing a piston comprising forming the skirt of the piston with bearing faces having their edges tapering in an axial direction, separating adjacent portions of the skirt and the head, slotting the skirt in substantially an axial direction and rotating the piston in engagement with a grinding element.

3. The method of producing a piston comprising forming the skirt of the piston with openings on each side of the piston pin bosses and with bearing faces having their edges tapering in substantially an axial direction, slotting the skirt in an axial direction and rotating the piston in engagement with a grinding element having a width equal to the length of the piston.

4. The method of producing a piston comprising forming the skirt of the piston with similar bearing faces having their edges tapering in substantially an axial direction, slotting one of the bearing faces and rotating the piston in engagement with a grinding element extending the entire length of the piston.

5. The method of producing a piston comprising forming a piston with openings adjacent the piston pin bosses and with skirt portions having their edges tapering in an axial direction and supported by the piston pin bosses, slotting at least one of the skirt portions intermediate the bosses and rotating the piston in engagement with a grinding element extending the entire length of the piston.

6. A method of producing a piston comprising forming the skirt with relieved surface areas at the end of the pin bosses and tapering the surface area adjacent the sides of the relieved areas in an axial direction, and rotating the piston in fixed engaging relation with a grinding wheel.

7. The method of finishing a hollow, cylindrical article which comprises supporting the interior in such a way as to hold an open end portion of the wall more firmly along one diameter of the article than along a second diameter at right angles to the first diameter, and then grinding the exterior of the article.

8. The method of finishing a hollow, cylindrical article having a closed end, which comprises holding a true center on the closed end, supporting the interior in such a way as to hold the open end portion of the wall of the article more firmly along one diameter than along a second diameter at right angles to the first diameter, and then grinding the exterior of the article.

9. The method of finishing a piston having a closed head and pin bosses, which comprises holding a true center on the closed end, supporting the interior in such a way as to support the open end wall of the piston more firmly along a diameter parallel to the axis of the pin bosses than along a diameter at right angles to the axis of the pin bosses, and then grinding the exterior of the article.

10. The method of finishing a hollow, cylindrical article, which comprises supporting the interior in such a way as to support the wall of the article at an open end portion more firmly along one diameter than along a second diameter at an angle to the first diameter and then grinding the exterior of the article.

11. The method of producing a piston comprising forming the skirt with portions of different areas, associating the piston in pressure engaging relation with a grinding wheel at least the full length of the skirt to be ground and with the axes in the same plane, and rotating both the grinding wheel and the piston, the pressure relation of the wheel with the piston finishing the skirt in elliptical cross-section.

ROBERT N. BROWN.